Jan. 7, 1958 V. TRIEF 2,819,172

METHOD FOR PRODUCING A HYDRAULIC BINDER IN POWDER FORM

Filed May 27, 1954

INVENTOR
VICTOR TRIEF
BY Robert H. Jacob
AGENT

2,819,172
METHOD FOR PRODUCING A HYDRAULIC BINDER IN POWDER FORM

Victor Trief, Brussels, Belgium; Carion Olga-Emma Trief, administratrix of said Victor Trief, deceased Application May 27, 1954, Serial No. 432,882

Claims priority, application France June 1, 1953

6 Claims. (Cl. 106—102)

The invention relates to a method for producing a hydraulic binder in powder form, starting from aqueous paste prepared by wet grinding solid starting materials, especially granulated blast furnace slag or synthetic slag which, after having been ground to a high degree of fineness, constitutes a product having high latent hydraulic binding properties.

In order to activate such a product, that is to say, to let the hydraulic properties appear and make the product able to set as a good hydraulic binder, all that need be done is to add to the product, preferably when it is used for preparing mortar or concrete, a suitable activator such as, for instance, Portland cement or a soluble base that will cause the formation of OH ions in the presence of water, or any other suitable substance. The quality of such a hydraulic binder in powder form is a direct function of the degree of fineness of its ground particles and, since it is the wet grinding method that permits achieving the highest degrees of fineness, this method will be resorted to in practice in order to achieve a high quality product. By wet grinding granulated blast furnace slag or synthetic slag, without the addition of an activator, the danger of prematurely activating the product is eliminated, so that the latter retains its hydraulic properties in a perfectly latent state. Transforming the said paste into a fine powder yields a powder which may be stored during a practically unlimited period, without the risk of alteration.

In applicant's prior Patent No. 2,632,711 of March 24, 1953, there is disclosed a method by which the granulated slag is ground by the wet method, so as to achieve the hydraulic binder in the form of a pasty mass which is subjected, before it has the opportunity of undergoing an alteration, to a desiccating action, preferably completed by a dispersing action, whereby the mass is brought into a state of fine powder, which powder has an important latent hydraulic efficiency and may have the activator added to it at any required moment.

The drying of the said paste, however, poses a very complex problem. More specifically, the drying should be effected with as small an expenditure of power as possible; it is further of interest that it should be carried out in an apparatus of reduced bulkiness and high efficiency, and one which is sufficiently flexible in operation. It is also desirable that heating the paste to more than about 50° C. should be avoided, because a higher temperature may act as an activator and cause a premature setting, whereby the obtention of a powder having the required properties is prevented.

Apparatus for the production of valuable articles, such as powdered milk, are known, including a container into which the liquid material is introduced by means of a rotary atomizer which projects the finely divided liquid into heated air, generally purified, which is blown into the container. Such air has to be heated to a relatively low and well determined temperature, which can merely vary within very narrow limits.

Surprisingly, it has been found that an apparatus of this kind may be adapted for drying a paste resulting from the wet grinding of slag and makes it possible to obtain a product of high quality in powder form under particularly interesting conditions and at the expenditure of a small amount of power.

According to the invention, the slag paste yielded from the wet grinding mill is conveyed directly to the atomizer device, without any previous treatment, and is introduced thereby, in a finely divided state, into a drying tower which is supplied with hot gases of relatively high temperature, which cause the product to dry instantaneously, the said product being ready for use upon leaving the said tower. The solid particles swept along by the current of gas may be easily separated therefrom in a dust extracting apparatus.

It has been found that there is no need to heat air and that one may conveniently use hot gases direct, either produced by a burner or made up of recovery gases from a related plant, which is very economical and eliminates any heat exchange device.

It has further been found that one may use gases at high temperature, for instance 400 to 500° C., without the danger of destroying the latent hydraulic binding properties of the finely ground slag, in spite of the fact that the latter product is normally activated under the influence of high temperatures. The latter result seems to be achieved not only due to the fact that the drying action is instantaneous—while it would not be achieved at a less high temperature, that would be applied during a longer period of time—but also owing to the fact that the $CO_2$ contained in the gases has a protecting effect upon the particles of ground slag, which opposes the starting of the setting action, the said effect being the more efficient as the gases are in contact with the whole surface of the finely divided particles of the atomized paste, such surface being large as compared with the volume of the particles.

Moreover, the atomization makes it possible to obtain a product having particles of very great fineness, which is very beneficial to the quality of the binder. The powder as yielded has no tendency to coagulate, which also seems to be accounted for by the fact that the superficial zone of the particles, which is subjected to the action of the $CO_2$, shows no tendency towards coagulation. This also seems to be a reason for which concrete prepared with the powder according to the invention shows a better workability.

Finally, it has been found that, in the method according to the invention, the temperature of the gases may vary between wide limits without causing any practical inconvenience, which makes it possible to use recovery gases coming from different sources. From the standpoint of the thermal efficiency, however, it is preferable to apply relatively high temperatures, because the loss of calories through the stack is proportionally smaller in the latter instance, since the temperature of the exhaust gases may remain practically the same, namely of the order of 100° C. The consumption will be, for example, of the order of 1000 calories per litre of water when using a gas at 400° C., which is quite an interesting result.

The method according to the invention has the further advantage that it makes it possible to convey directly to the atomizer a paste having a relatively high water content, preferably of the order of 30% with respect to the total weight of the paste, which is a water content which makes it possible to effect the wet grinding of the slag under perfect conditions. Thus, with one and the same water content, this method provides for good operating conditions both in the grinding mill and in the atomizer, whereby any intermediate treatment of the paste is eliminated. As a result, the method of preparing the aforesaid binder in powder form by wet grinding granulated slag is greatly simplified, since the drying of the paste that comes out of the grinding mill is effected in one single step which provides at the same time for a very fine comminution of the material.

By way of illustration, one apparatus according to the invention will be described hereinafter with reference to the accompanying drawings, in which.

Figure 1:
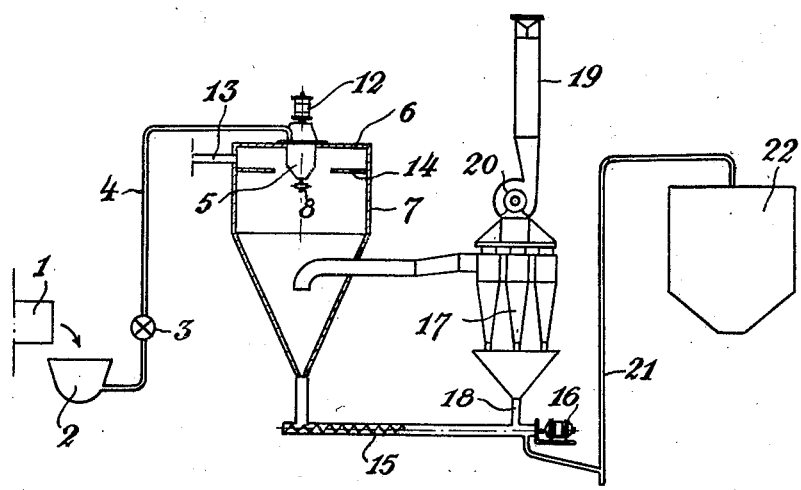
Figure 1 is a diagrammatic general view, partly in vertical section.
Figure 2:
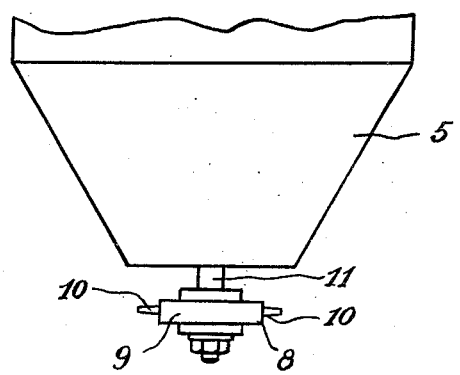
Figure 2 is a view drawn to a larger scale of a portion of the atomizer device.

In the drawing, 1 indicates the discharge end of a grinding mill for wet grinding slag, for example, a ball mill. The paste drops into a paste tank 2 whence it is extracted by means of a pump 3 which conveys the paste through the pipe 4 into the hopper 5 of an atomizer device mounted on the cover plate 6 of a drying tower 7. At the bottom of the hopper 5 the paste enters the atomizer proper 8 which includes a paste receiving bowl 9 and several nozzles 10 distributed over the periphery of the said bowl and through which the paste is expelled under the action of the centrifugal force when the atomizer, which is mounted on the shaft 11, is rotated by the motor 12 mounted unto the cover plate 6. The paste is therefore projected at a high speed and in a finely divided state into the tower 7, into the mass of hot gases supplied through the pipe 13 and directed to the vicinity of the atomizer owing to the provision of the annular partition 14. The hot gases may be the combustion gases of a burner specially provided to this effect or they may be recovery gases proceeding from any source. It is convenient to use a burner operated with firing oil, the combustion gases whereof have a composition suitable for the drying action according to the invention.

The paste is instantaneously dried and the dry particles collect in the conical bottom of the tower 7, whence the powder so yielded is carried off by means of a worm conveyor 15 driven by the motor 16, or with the help of any other suitable conveyor. The dust carried along by the gases is deposited in a dust extractor 17 whence it is brought through pipe 18 to the said conveyor, the gases being further exhausted, through the stack 19 for instance, by means of a fan 20 which causes the gases to circulate in the apparatus. The powder collected at the discharge end of the conveyor 15 is directed to the storage bunker 22 through the pipe 21.

I claim:

1. In a method for producing powdered cementitious material having high latent hydraulic binding properties and suitable for use as cement after adding a catalytic substance to bring about setting, grinding to cement fineness granulated slag by the wet method to a liquid paste containing the slag in a finely divided form, continuously supplying the paste in undecanted condition to a centrifugal atomizer and spraying the paste by centrifugal action in a finely divided form into an enclosure, passing through said enclosure gases containing $CO_2$ at a temperature range of preferably about 300° to 500° C. to contact and instantaneously dry the particles of finely divided paste and obtaining a dry powder, and collecting the dry powder.

2. In a method as claimed in claim 1, using as drying gases hot gases containing $CO_2$.

3. In a method as claimed in claim 1, wet grinding the slag with an amount of water adjusted so as to obtain a paste having a water content of about 30%, and directly conveying the paste thus obtained to the atomizer.

4. In a method as claimed in claim 2, using as hot gases the gaseous combustion products from an oil burner.

5. In a method for producing a powdered cementitious material having high latent hydraulic binding properties and suitable for use as cement after adding an activating catalytic substance to bring about setting, grinding to cement fineness granulated slag by the wet method to a liquid paste containing the slag, continuously supplying the paste of cementitious material in undecanted condition to a centrifugal atomizer and thereby centrifugally spraying the cementitious material in a finely divided wet form into an enclosure, passing through said enclosure in intimate contact with said material a substantially non-oxidizing gaseous mixture including $CO_2$ for inhibiting activation of said material, said gas being in sufficiently hot condition to instantaneously dry the discrete particles of finely divided paste, obtaining a dry non-coherent powder thereby, and collecting the powder.

6. In a method for producing a powdered cementitious material having high latent hydraulic properties and suitable for use as cement after adding an activating catalytic substance to effect setting, grinding to cement fineness granulated slag in the presence of water adjusted to a content of 30% while grinding the mixture to a liquid paste containing the slag, continuously supplying the paste of cementitious material in undecanted condition directly to a centrifugal atomizer and thereby centrifugally spraying the cementitious material in finely divided wet form into an enclosure, passing through said enclosure in intimate contact with said material a substantially non-oxidizing gaseous mixture including $CO_2$ for inhibiting activation of said material, said gas being in sufficiently hot condition to instantaneously dry the discrete particles of finely divided paste, obtaining a dry non-coherent powder thereby, and collecting the powder.

References Cited in the file of this patent

UNITED STATES PATENTS

| 1,523,632 | China | Jan. 20, 1925 |
| 1,561,971 | Coffin | Nov. 17, 1925 |
| 1,609,993 | Dickerson | Dec. 7, 1926 |
| 1,785,533 | Schwantes | Dec. 16, 1930 |
| 2,110,167 | Northcutt | Mar. 8, 1938 |
| 2,287,795 | Hall | June 30, 1942 |
| 2,421,648 | Pickens | June 3, 1947 |
| 2,514,064 | Huelsdonk | July 4, 1950 |
| 2,632,711 | Trief | Mar. 24, 1953 |
| 2,656,119 | Shelton | Oct. 20, 1953 |
| 2,670,036 | Spalding | Feb. 23, 1954 |
| 2,698,815 | Bishop | Jan. 4, 1955 |